(12) United States Patent
Sano et al.

(10) Patent No.: US 7,365,887 B2
(45) Date of Patent: Apr. 29, 2008

(54) IMAGE SENSOR UNIT

(75) Inventors: Toshio Sano, Tokyo (JP); Hiroshi Ieki, Tokyo (JP); Minoru Miyaji, Tokyo (JP); Hironobu Arimoto, Tokyo (JP)

(73) Assignees: Ricoh Company, Ltd., Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 1040 days.

(21) Appl. No.: 10/614,819

(22) Filed: Jul. 9, 2003

(65) Prior Publication Data
US 2004/0075873 A1    Apr. 22, 2004

(30) Foreign Application Priority Data
Jul. 10, 2002   (JP)   .............. 2002-201756

(51) Int. Cl.
*H04N 1/04*     (2006.01)
*H01J 11/00*    (2006.01)

(52) U.S. Cl. ............... 358/475; 358/474; 358/482; 313/607

(58) Field of Classification Search ........... 358/475, 358/474, 482; 313/607, 594
See application file for complete search history.

(56) References Cited

U.S. PATENT DOCUMENTS 3,275,872 A * 9/1966 Chernin et al. ............ 313/488
3,886,396 A * 5/1975 Hammer et al. ........... 313/486
5,382,879 A * 1/1995 Council et al. ............ 315/248
6,614,185 B1 * 9/2003 Nishimura et al. ......... 313/607

FOREIGN PATENT DOCUMENTS

| DE | 42 03 594   | 10/1992 |
|----|-------------|---------|
| DE | 101 40 356  | 2/2003  |
| JP | 4-106896    | 4/1992  |
| JP | 11-283579   | 10/1999 |
| JP | 2000-156203 | 6/2000  |
| JP | 2001-102004 | 4/2001  |
| JP | 2001-123988 | 5/2001  |

* cited by examiner

*Primary Examiner*—Houshang Safaipour
(74) *Attorney, Agent, or Firm*—Oblon, Spivak, McClelland, Maier & Neustadt, P.C.

(57) ABSTRACT

An image sensor unit has an electric discharge light emitting lamp for producing an illumination beam. The lamp includes a first electrode and a second electrode facing each other and defining a discharge space between them along the longitudinal axis of the lamp. A first light emitting layer and a second light emitting layer are provided in the discharge space so as to face each other and to cover the first and second electrodes, respectively. A dielectric material is inserted between the first electrode and the first light emitting layer, and between the second electrode and the second light emitting layer. At least one of the first and second light emitting layers is arranged so as to define an uncovered region, in which at least one of the dielectric material, the first electrode, and the second electrode is exposed to the discharge space.

10 Claims, 4 Drawing Sheets

IMAGE SENSOR UNIT

BACKGROUND OF THE INVENTION

1. Field of the Invention

The present invention relates to an image sensor unit, and more particularly, to an improved structure of a continuously dischargeable light source used in the image sensor unit, which can improve the starting characteristic of the light source for achieving stable glow discharge (that is, so-called continuous electric discharge).

2. Description of the Related Art

In general, photocopy machines, facsimile machines, scanners, and other image-reproducing machines use an image sensor unit to optically read the image from the original. Some image sensor units use a certain type of light source that makes use of continuous electric discharge occurring between electrodes, instead of utilizing the light emitting phenomenon of thermal particles from a filament.

One example of the light source making use of the continuous electric discharge comprises a light-emitting body made of a dielectric material and shaped as an airtight container, filled with xenon gas, for example under a prescribed vacuum atmosphere. In the container, a fluorescent material layer is provided, except for a certain region, and two electrodes are arranged so as to face each other with a space between them. When a discharge starting voltage is applied between the electrodes, a strong electric field is generated between them, and the gas filled in the container is ionized and excited to produce ultraviolet rays. The ultraviolet rays cause the fluorescent material layer to emit light, functioning as the light source.

If the object to be optically scanned, such as an original, has a flat surface, a plate glass with a flat surface is used in the image sensor unit to hold the scanned surface of the original. In this case, the light emitting structure described above is placed below the plate glass so as to irradiate the original from the bottom.

It is important for the above-described type of image sensor unit to reliably provide the starting characteristic of the light source. Accordingly, it is proposed to create a localized area of the strong electric field to enhance the electric discharge efficiency, thereby securing continuous light emission across the entire range (see, for example, JPA 11-283579). It is also proposed to use an additional light source to irradiate the light emitting body in order to ionize and excite the gas filled in the light emitting body (see, for example, JPA 4-106896). Still another proposal is to mix a material that easily emits electrons in the fluorescent material used in the light emitting body, instead of irradiating the light emitting body (see, for example, JPA 2000-156203 and JPA 2001-123988). Yet another proposal is that a portion of the fluorescent layer be removed so as to allow initial electrons to emit from this removed portion for the purpose of starting ionization and excitation of the gas (see, for example, JPA 2001-102004). The emission of the initial electrons is compared to a "small flame" for sequentially causing ionization and excitation to achieve continuous electric discharge.

However, there are several problems in the above-described prior art techniques of enhancing the starting characteristic.

First, the conventional method of generating a strong electric field requires auxiliary electrodes to generate such a strong electric field, and the configuration of the light emitting body, including the ordinary electrodes, has to be changed. This results in increased cost. Particularly, if the height of the discharge space defined by the light emitting body is insufficient, the insulating distance of the auxiliary electrodes cannot be maintained reliably. This drawback may cause dielectric breakdown, and therefore, cause the light source to return to the dark state, causing dark current. In addition, the lighting circuit may be damaged, or the inside of the image sensor unit may be burned. Consequently, the starting characteristic cannot be improved efficiently.

Second, with the prior art technique using an additional light source, or mixing a material that easily emits electrons in the fluorescent layer, the emitted electrons are likely to be captured if the purity of the gas filled in the light emitting body is degraded. Since this phenomenon adversely affects the efficiency of the ionization and the excitation of the gas, the purity of the gas has to be maintained high. In addition, when a portion of the electrode is exposed, sputtering occurs on the exposed surface of the electrode, and the illumination of the light source decreases.

Third, with the prior art technique of removing a portion of the fluorescent material layer to expose the underlying layer or material to the gas, the quantity of light may become uneven or insufficient within the scanning range of the original, which is the scanning target of the image sensor unit. This may cause the S/N ratio to be degraded. In addition, since most of the surface of the light emitting body made of a dielectric is covered with the fluorescent material layer, the voltage applied between the electrodes has to be increased in order to guarantee initial emission of electrons. It is difficult for the light source of this technique to maintain electric discharge continuously along the longitudinal axis of the light emitting body, even if weak electric discharge has occurred at the exposed portion, and in the worst case, electric discharge may stop.

Therefore, it is an object of the present invention to overcome the above-described problems in the conventional image sensor units, especially in the light emitting part making use of continuous electric discharge, and to provide an image sensor unit with an improved starting characteristic that can prevent undesirable dielectric breakdown and cost increase. This image sensor unit has a light emitting body that is capable of providing continuous electric discharge across the entire scanning area of the light emitting body, while preventing the degradation of the S/N ratio.

SUMMARY OF THE INVENTION

To achieve the object, an image sensor unit having an electric discharge light emitting lamp for producing an illumination beam is provided. The lamp comprises a first electrode and a second electrode facing each other and defining a discharge space between them along the longitudinal axis of the lamp. A first light emitting layer and a second light emitting layer are provided in the discharge space so as to face each other and to cover the first and second electrodes, respectively. A dielectric material is inserted between the first electrode and the first light emitting layer, and between the second electrode and the second light emitting layer. At least one of the first and second light emitting layers is arranged so as to define an uncovered region, in which at least one of the dielectric material, the first electrode, and the second electrode is exposed to the discharge space.

When a voltage is applied between the first and second electrodes, initial electrons emit from the uncovered region, which causes electric discharge in the discharge space in which electrically charged particles collide each other.

Ultraviolet rays generated from the electric discharge illuminates the light emitting layer that faces the discharge space, causing the light emitting layer to emit an illumination beam.

The uncovered region, which is not covered with the light emitting layer, extends from one end of the lamp continuously or discontinuously along the longitudinal axis of the lamp.

It is desirable for the uncovered region to be arranged outside the scanning area of the image sensor unit.

Preferably, in the uncovered region, a photoemission material that easily emits photoelectrons is contained.

If the dielectric material is exposed to the discharge space in the uncovered region, a photoemission material is contained in the exposed portion of the dielectric material.

Alternatively, if the first or second electrode is exposed to the discharge space in the uncovered region, a photoemission material is contained in the exposed portion of the first or second electrode.

Preferably, the image sensor unit further comprises an external light source configured to irradiate the uncovered region of the lamp.

BRIEF DESCRIPTION OF THE DRAWINGS

Other objects, features, and advantages of the present invention will become more apparent from the following detailed description when read in conjunction with the accompanying drawings, in which.

DETAILED DESCRIPTION OF THE EMBODIMENTS

The preferred embodiments of the present invention will now be described in detail with reference to the attached drawings.

Figure 1:
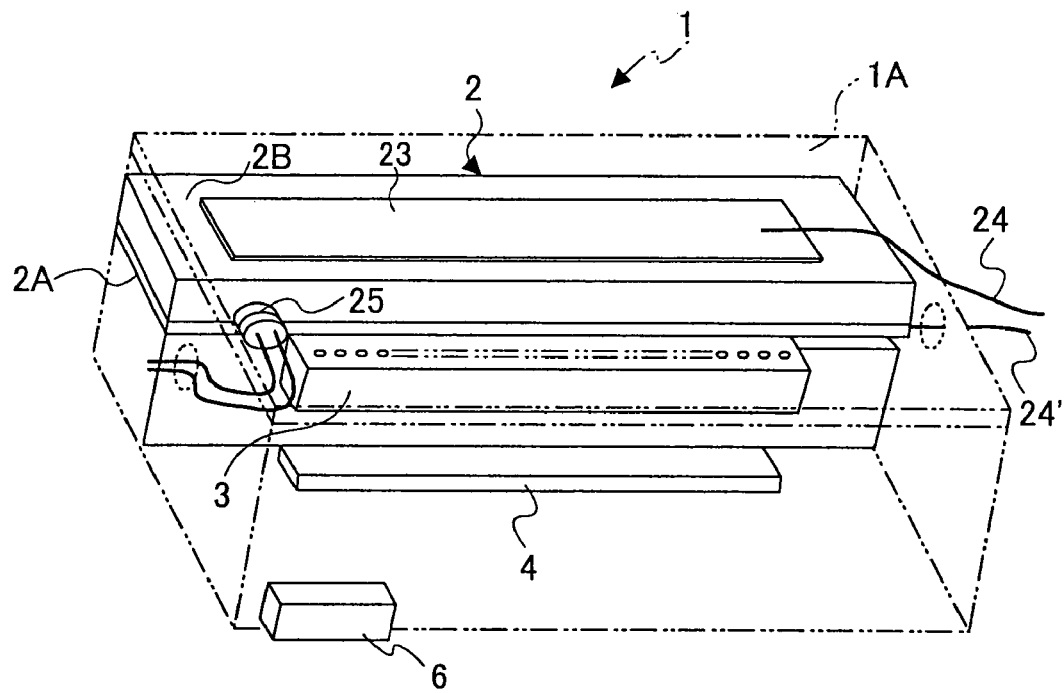
FIG. 1 is a schematic perspective view of the image sensor unit according to an embodiment of the present invention.

FIG. 1 is a schematic perspective view of the image sensor unit according to an embodiment of the present invention. The image sensor unit 1 comprises a casing unit 1A, in which a light emitting lamp 2, a SELFOC lens array 3 that defines a focusing light transmission body, and a circuit element substrate 4 on which a set of light-receiving elements are accommodated.

Figure 2:
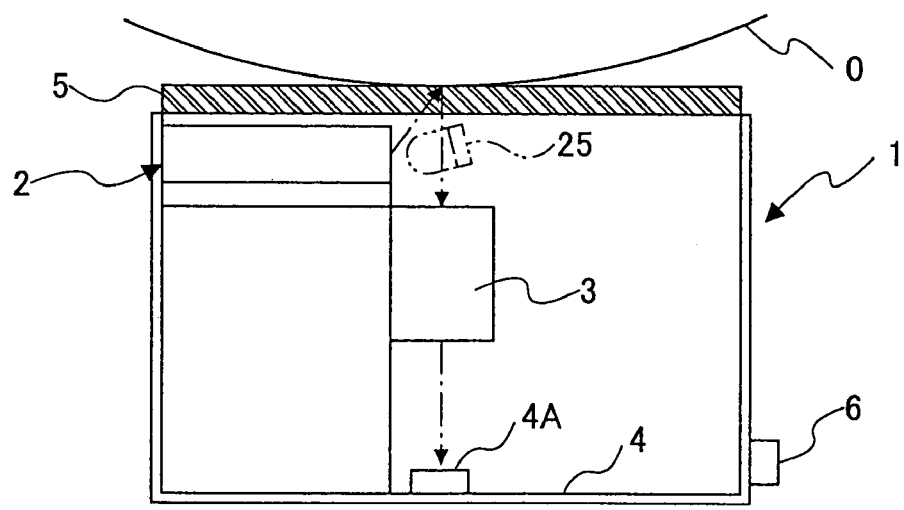
FIG. 2 is a schematic diagram of the image sensor used to explain the scanning operation of the image sensor unit shown in FIG. 1.

In the scanning operation of the image sensor unit 1, the original O placed on the mount, such as the contact glass 5, is irradiated by the illumination light emitted from the electric discharge light emitting source (or the lamp) 2, as indicated by the arrow of the dashed line in FIG. 2. The light reflected from the original O is focused onto the light-receiving element 4A formed on the circuit element substrate 4, via the SELFOC lens array 3, thereby reading the images or information from the original O. The numerical reference 6 denotes the connector for electrically connecting the circuit element substrate 4 to an external controller (not shown).

Figure 3:
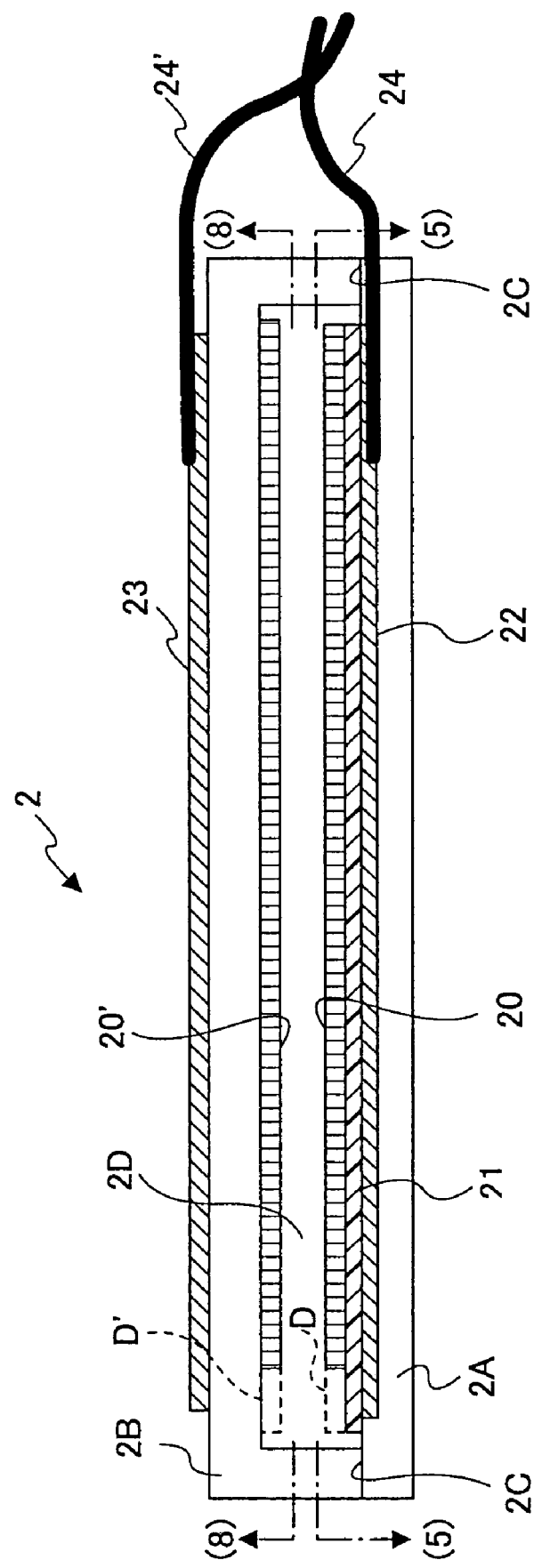
FIG. 3 is a vertical cross-sectional view of the light emitting lamp used in the image sensor unit shown in FIG. 1, taken along the longitudinal axis of the light emitting lamp.

FIG. 3 and the subsequent figures illustrate the structure of the light emitting lamp 2.

FIG. 3 is a vertical cross-sectional view of the light emitting lamp 2 taken along the longitudinal axis thereof. The light emitting lamp 2 comprises a first plate 2A and a second plate 2B, each being transparent to light and made of a dielectric containing a photoemission material, such as an oxide of an alkaline-earth metal. The first and second transparent plates 2A and 2B are combined together and sealed with a sealing member 2C (e.g., frit glass) in an airtight manner to form a lamp body. In the lamp body, a discharge space 2D is formed between electrodes 22 and 23. The discharge space 2D is set to the prescribed vacuum atmosphere, and filled with a discharge gas, such as xenon (Xe) gas.

The internal electrode 22 is provided on the first plate 2A so as to face the discharge space 2D. The internal electrode 22 is covered with an insulating layer 21 for electrical insulation, on which a light-emitting layer 20 made of a fluorescent material is placed. The inner face of the second plate 2B is furnished with a light emitting layer 20' made of a fluorescent material, facing the discharge space 2D. The external electrode 23 is provided on the outer face of the second plate 2B. The external electrode 23 is positioned so as to face the internal electrode 22 formed on the first plate 2A via the second plate 2B and the discharge space 2D.

Harnesses 24 and 24' are soldered to the internal electrode 22 and the external electrode 23, respectively. The harnesses 24 and 24' are connected to the external lighting circuit (not shown) at the other ends. Although not shown, the external electrode 23 may be furnished with a grounding structure, or alternatively, covered with an insulating film, for the purpose of safe operation and shielding external noise.

Figure 4:
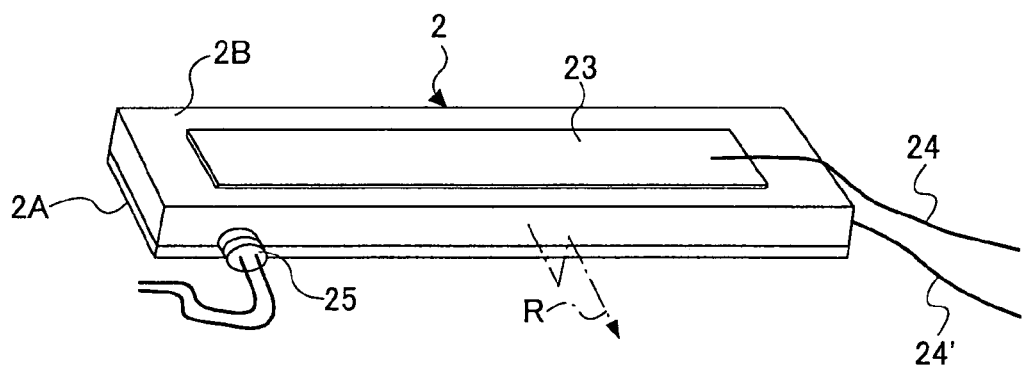
FIG. 4 is a perspective view of the light emitting lamp shown in FIG. 3.

The light emitting lamp 2 of this example is designed so as to emit light from a plane perpendicular to the top face of the second plate 2B on which the external electrode 23 is provided, as indicated by the dashed arrow R in FIG. 4.

Certain regions of the inner faces of the first and second plates 2A and 2B are not covered with the light emitting layers 20 and 20', as indicated by symbols D and D', respectively, along the longitudinal axis of the light emitting lamp 2. These regions are referred to as the uncovered regions D and D'. Portions of the electrodes 22 and 23, which define the charged particle colliding space of the discharge gas, fall in the uncovered regions D and D'. With this arrangement, the insulating layer 21, and/or the electrode 22, and/or the electrode 23 are exposed to the discharge space 2D, without being covered with the light emitting layer 20 or 20'.

The uncovered regions D and D' are located at or near the end of the light emitting lamp 2. The uncovered regions D and D' may extend from the end of the light emitting lamp 2 continuously along the longitudinal axis of the light emitting lamp 2, or alternatively, they may be located locally or discontinuously in the light emitting lamp 2. In either case., if a large-sized uncovered region is produced, such a large region is arranged outside the scanning area in order to prevent the light quantity from decreasing locally or from becoming uneven in the scanning range. This arrangement can also prevent the S/N ratio from degrading during the operation of optically reading an original.

Figure 5:
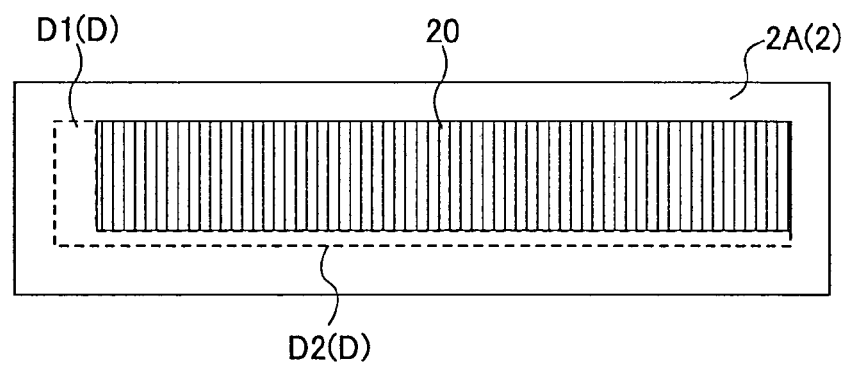
FIG. 5 is a plan view of the first part of the light emitting lamp of FIG. 3 viewed in the direction indicated by the arrows (5) in FIG. 3, illustrating the arrangement of the uncovered regions.

FIG. 5 illustrates a plan view of the first plate 2A viewed from the arrow (5) shown in FIG. 3. In this example, the uncovered region D1 is located at one end of the light emitting layer 20, and another uncovered region D2 extends from the region D1 along the lengthwise edge of the light emitting layer 20 parallel to the longitudinal axis thereof. A portion of the insulating layer 21 and/or a portion of the internal electrode 22 falls in the uncovered regions D1 and/or D2, which will be explained below.

Figure 6:
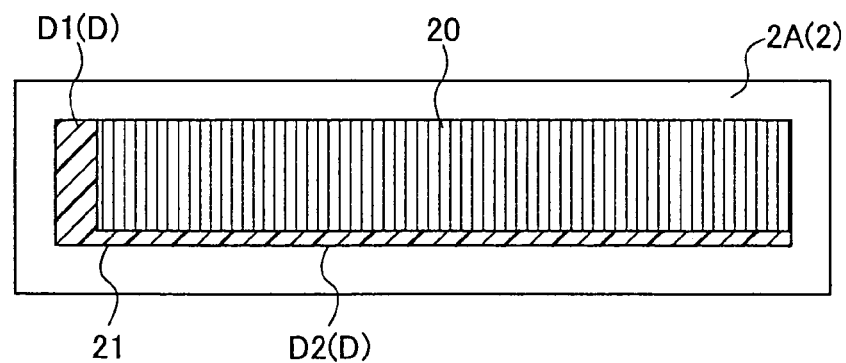
FIG. 6 illustrates the positional relation between the light emitting layer and the insulating layer positioned below the light emitting layer, which is used to explain the arrangement of the uncovered regions shown in FIG. 5.

FIG. 6 is a plan view of the first plate 2A, illustrating the positional relation between the light emitting layer 20 and the insulating layer 21 formed on the first plate 2A. A portion of the insulating layer 21 is exposed to the discharge space 2D because the light emitting layer 20 does not cover the insulating layer 21 in the uncovered regions D1 and D2. In this example, the underlying internal electrode 23 (not shown in FIG. 6) is formed so as to project from the light emitting layer 20, but not to project from the insulating layer 21.

A photoemission material, such as an oxide of an alkaline-earth metal, may be mixed into the exposed portion or the entirety of the insulating layer 21 in order to guarantee a sufficient quantity of light in the uncovered regions D1 and D2. Alternatively, a photoemission material layer may be formed on the exposed surface of the insulating layer 21.

Figure 7:
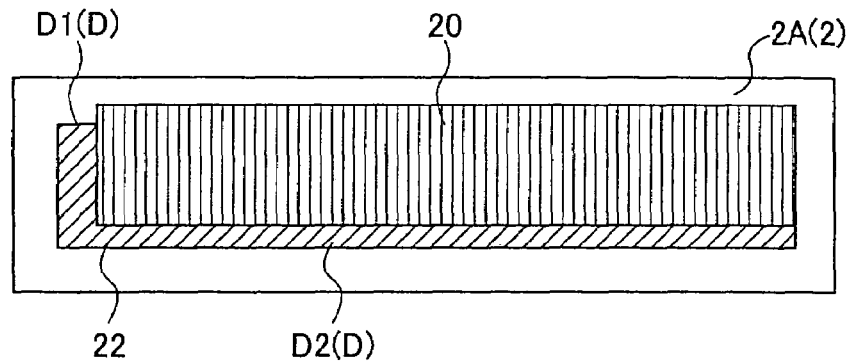
FIG. 7 illustrates the positional relation between the light emitting layer and the internal electrode, which is used to explain the arrangement of the uncovered regions shown in FIG. 5.

FIG. 7 is a plan view of another example of the first plate 2A, illustrating the positional relation between the light emitting layer 20 and the internal electrode 22 formed on the first plate 2A. In this example, the insulating layer 21 is covered with the light emitting layer 20, and is not exposed to the discharge space 2D. The internal electrode 22 projects from the light emitting layer 20 at one end of the light emitting layer 20 within the uncovered region D1, and simultaneously projects from the light emitting layer 20 along a lengthwise edge thereof in the uncovered region D2. These projecting portions of the internal electrode 22 are exposed to the discharge space 2D. Consequently, the voltage applied between the internal electrode 22 and the external electrode 23 can be maintained low. A photoemission material may be mixed into the electrode material, or a photoemission material layer may be formed on the exposed surface of the internal electrode 22.

Figure 8:
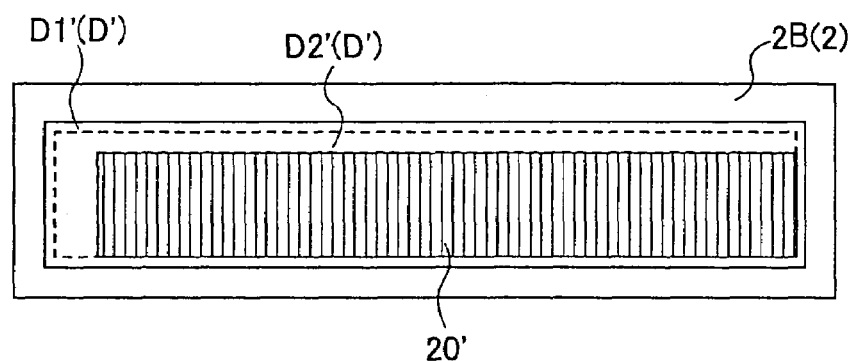
FIG. 8 is plan view of the second part of the light emitting lamp of FIG. 3 viewed in the direction indicated by the arrows (8), illustrating the arrangement of the uncovered regions.

FIG. 8 illustrates a plan view of the second plate 2B viewed from the arrow (8) shown in FIG. 3. The uncovered region D1' is located at one end of the light emitting layer 20', and another uncovered region D2' extends from the uncovered region D1' along a lengthwise edge of the light emitting layer 20' in parallel to the longitudinal axis thereof.

Figure 9:
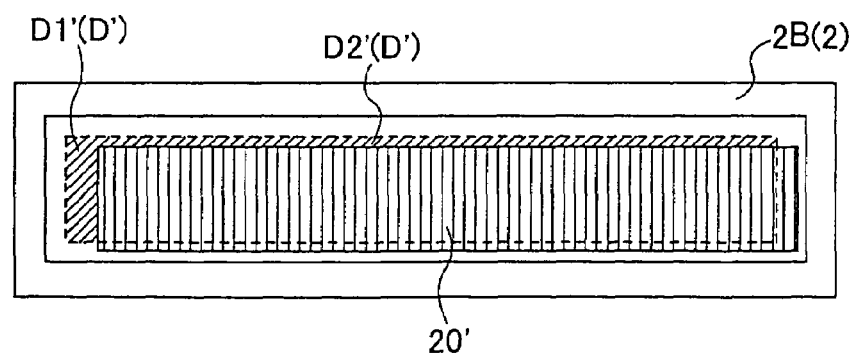
FIG. 9 illustrates the positional relation between the light emitting layer and the external electrode, which is used to explain the arrangement of the uncovered regions shown in FIG. 8.

FIG. 9 illustrates the positional relation between the light emitting layer 20' and the external electrode 23 formed on the outer surface of the second plate 2B. The external electrode 23 projects from the light emitting layer 20' formed inside the second plate 2B, and therefore, faces the discharge space 2D via the transparent second plate 2B in the uncovered regions D1' and D2'.

In the uncovered regions D1' and D2', the dielectric that forms the second plate 2B is exposed to the discharge space 2D. Because of the photoemission material mixed into the second plate 2B, the light quantity can be prevented from dropping in the uncovered regions D1' and D2'.

In the uncovered regions D and D' in which the light emitting layer 20 and 20' are not formed, the exposed portions of the plate 2A, 2B, and/or the insulating layer 21 directly face the discharge space 2D. These exposed portions contain a photoemission material, such as an oxide of an alkaline-earth metal. The photoemission material may also be mixed into the internal electrode in the uncovered regions D and D'.

In this manner, at least one of the group consisting of the plate material, the insulating layer 21, and the electrode 22 are exposed directly to the discharge space 2D in the uncovered regions D and D' that are not covered with the light emitting layers 20 and 20' inside the light emitting lamp 2. Consequently, when a voltage is applied between the electrodes 22 and 23, emission of initial electrons can be facilitated in the uncovered regions, as compared with the other regions covered with the light emitting layer. In addition, because the uncovered regions are formed along the longitudinal axis of the light emitting lamp, the emission of the initial electrons is guaranteed across the entire range of the light emitting layers 20 and 20'. Consequently, the starting characteristic of the light emitting lamp can be improved.

Next, another embodiment of the present invention will be described.

In this embodiment, an additional light source is used to illuminate the uncovered regions that do not include the light emitting layer.

As illustrated in FIG. 1, FIG. 2 and FIG. 4, an external light source 25 (such as an LED, a midget lamp, or an EL) is placed near the light emitting lamp 2. In the preferred example, a blue LED capable of emitting a short-wavelength light with high photon energy is used. The blue LED is arranged so that the light beam is easily guided onto the uncovered regions.

The light emission control of the external light source 25 is performed by a lighting circuit (not shown), which keeps the external light source 25 in the ON state for a prescribed time prior to activating the light emitting lamp 2.

If the external light source 25 is turned on, the light beam emitted from the external light source 25 irradiates the uncovered regions D and D' of the light emitting lamp 2, which are not covered with the light emitting layers 20 and 20', respectively. In response to the irradiation, initial electrons emit from the photoemission material located at the surface exposed directly to the discharge space 2D. In the electric field produced between the electrodes 22 and 23, the emitted electrons are accelerated and move at a high speed in the discharge gas filling the discharge space 2D, while amplifying the ionization of the discharge gas, and finally reach the light emitting layer or the uncovered region on the opposite electrode side. When ultraviolet rays generated due to the ionization and the excitation of the discharge gas strike the light emitting layer, satisfactory light emission is achieved.

Depending on the polarity of the voltage at the electrode, the electrons and ions generated from the ionization and excitation of the discharge gas are absorbed in the light emitting layer, and the underlying insulating layer and the electrode. In this case, the electric field between the electrodes may be weakened, and the electric discharge cannot be sufficiently maintained. To prevent this situation, a voltage with an opposite polarity is generally applied between the electrodes to inverse the direction of the electric field in a periodic manner. However, it is generally difficult for those electrons absorbed in the light emitting layer to emit to the discharge space unless the inverted electric field is made strong. Accordingly, it may take a long time for the electron to receive energy sufficient to emit. This means that it takes a long time before electric discharge starts in the discharge gas. In this case, the polarity of the electric field is again inverted to the previous state, without producing light emission during the inverted period.

This undesirable situation can be effectively prevented by the present invention because the uncovered regions D2 and D2' are formed along the longitudinal axis of the light emitting layer 20 and 20'. In the uncovered regions D2 and D2', the electrons can emit promptly from the insulating layer or the electrode at a lower voltage, as compared with electron emission from the light emitting layer, even if the polarity of the voltage is switched. Thus, light emission can be guaranteed during the discharge period.

In general, as the polarity inversion is repeated, the number of electrons emitted into the discharge gas increases, and consequently, the light emission phenomenon occurs in the entirety of the light emitting lamp. However, if the absorption of the electrons in the light emitting layer increases, it generally becomes difficult for the prior art technique to cause the light emitting phenomenon having occurred near the external light source 25 to spread over the entire space of the lamp. In contrast, with the present invention, the uncovered regions D2 and D2' allow electric discharge to easily and promptly spread over the entire space of the lamp, thereby improving the starting characteristic of the light emitting lamp 2.

In the above-described example, the uncovered regions D and D' in which the light emitting layers 20 and 20' are not formed are provided at an end opposite to the end portion at which the harnesses 24 and 24' are connected to the electrodes 22 and 23. However, the present invention is not limited to this example. The uncovered regions D and D' may be arranged at either end. The layout design of the uncovered regions, such as the location or the shape thereof, may be varied depending on the conditions. Although, in the above-described example, the uncovered regions are provided in the light emitting area, the present invention is not limited to this arrangement, and they may be arranged in any part as long as initial electron emission can be carried out reliably. In addition, the photoemission material may be contained only in one of the first and second plates 2A and 2B made of a dielectric material.

In conclusion, photoemission is performed promptly in response to application of voltage between the electrodes of the light emitting lamp, because the light emitting layer is arranges so as to expose a certain region (referred to as an "uncovered region") of the underlying layer to the discharge space. The initial electrons cause electric discharge in the discharge space, where electrically charged particles collide with each other. In the exposed region or the uncovered region, at least one of the first or second plate made of a dielectric material, the insulating layer, and the electrode is exposed to the discharge space. With this arrangement, emission of the initial electron can start more quickly than in the conventional method. This arrangement can also prevent the ionized electrons, which is generated by irradiation or external faint light, or by electric discharge in the gas filling the discharge space, from being absorbed deep into the light emitting layer. Consequently, photoelectrons can emit to the discharge space easily under application of an inverted electric field at a low voltage. The initial emission of photoelectrons in the low-voltage inverted electric field functions as a "small flame", and it hastens light emission in the other area covered with the light emitting layer. The fabrication cost of the light emitting lamp can be maintained low because of the simple structure, in which a portion of the light emitting layer made of, for example, a fluorescent material, is removed within the area facing the discharge space in which electrically charged particles collide with other particles.

Second, the uncovered region, in which the light emitting layer is not formed, extends from an end of the electric discharge light emitting lamp continuously or discontinuously along the longitudinal axis of the lamp. This arrangement promotes the electric field effect to act on the other regions, causing the "small flame" to run and extend to the other regions. If the uncovered region is formed continuously along the longitudinal axis of the electric discharge light emitting lamp, the "small flame" is generated across the length of the light emitting layer, which can hasten the start of light emission from the light emitting layer.

Third, if the uncovered region includes a large-sized region, such a large-sized region is located outside the target scanning area in order to prevent the S/N ratio from degrading during the optical reading. This arrangement is advantageous as compared with the case in which the uncovered region is arranged in the scanning area and light quantity becomes insufficient or uneven.

Fourth, since the photoemission material is contained in the uncovered region, the initial emission of photoelectrons can be performed efficiently, hastening electric discharge in the discharge space.

Fifth, since the uncovered regions face each other across the discharge space inside the lamp body sealed in an airtight manner, emission of photoelectrons from the uncovered region is guaranteed, avoiding the electron leakage from the area to the light emitting layers. Consequently, the starting characteristic can be improved.

Sixth, by irradiating the uncovered region using an additional light source, emission of photoelectrons from the photoemission material contained in the uncovered region can be promoted, in addition to electric discharge under the application of the electric field. With this arrangement, electric discharge is accelerated by combination of application of the electric field and irradiation from the external light source. Consequently, the starting characteristic can be further improved.

This patent application is based on and claims the benefit of the earlier filing date of Japanese patent application No. 2002-201756 filed Jul. 10, 2002, the entire contents of which are hereby incorporated by reference.

The invention claimed is:

1. An image sensor unit having an electric discharge light emitting lamp for producing an illumination beam, the lamp comprising a first electrode and a second electrode facing each other and defining a discharge space therebetween along the longitudinal axis of the lamp, wherein:
   a first light emitting layer and a second light emitting layer are provided in the discharge space so as to face each other and to cover the first and second electrodes, respectively;
   a dielectric material is inserted between the first electrode and the first light emitting layer, and between the second electrode and the second light emitting layer; and
   at least one of the first and second light emitting layers is arranged so as to define an uncovered region, in which at least one of the dielectric material, the first electrode, and the second electrode include a photoemission material and is exposed to the discharge space, the uncovered region including the photoemission material extending from one end to the other end of the lamp continuously or discontinuously over the range along the longitudinal axis of the lamp.

2. An image sensor unit having an electric discharge light emitting lamp for producing an illumination beam, the lamp comprising a first electrode and a second electrode facing each other and defining a discharge space therebetween along the longitudinal axis of the lamp, wherein:

a first light emitting layer and a second light emitting layer are provided in the discharge space so as to face each other and to cover the first and second electrodes, respectively;

a dielectric material is inserted between the first electrode and the first electrode and the first light emitting layer, and between the second electrode and the second light emitting layer; and a least one of the first and second light emitting layers is arranged so as to define an uncovered region, in which at least one of the dielectric material, the first electrode and the second electrode is exposed to the discharge space, wherein the uncovered region is arranged outside a scanning area of the image sensor unit.

3. The image sensor unit according to claim 1, wherein if the dielectric material is exposed to the discharge space in the uncovered region, a photoemission material is contained in the exposed portion of the dielectric material.

4. The image sensor unit according to claim 1, wherein if the first or second electrode is exposed to the discharge space in the uncovered region, a photoemission material is contained in the exposed portion of the first or second electrode.

5. The image sensor unit according to claim 1, further comprising an external light source configured to irradiate the uncovered region of the lamp.

6. The image sensor unit according to claim 1, wherein the lamp further comprises a lamp body consisting of a first part and a second part that are combined together and sealed up to form the discharge space between the first and second electrodes, wherein at least one of the first and second parts is transparent to light and made of said dielectric material.

7. The image sensor unit according to claim 6, wherein the first electrode is formed on an inner face of the first part, and the second electrode is formed on an outer face of the second part so as to be parallel to the first electrode.

8. The image sensor unit according to claim 7, wherein the first light emitting layer is formed above the first electrode via an insulating layer made of said dielectric material, and at least one of the insulating layer and the first electrode is exposed to the discharge space in the uncovered region.

9. The image sensor unit according to claim 7, wherein the second light emitting layer is formed on an inner face of the second part so as to define said uncovered region, the second part is made of said dielectric material, and a portion of the dielectric material of the second part is exposed to the discharge space in the uncovered region.

10. The image sensor unit according to claim 1, wherein the uncovered regions are arranged in the first and second light emitting layers, and face each other across the discharge space.

* * * * *